Patented June 26, 1934

1,964,279

UNITED STATES PATENT OFFICE 1,964,279

PROCESS FOR PRESERVING FRESH WHOLE MILK

Byron H. Webb, Washington, D. C.

No Drawing. Application April 30, 1934, Serial No. 723,183

2 Claims. (Cl. 99—8)

(Granted under the act of March 3, 1883, as amended April 30, 1928; 370 O. G. 757)

This application is in part a continuation of my application bearing Serial No. 607,517, filed April 25, 1932, in the United States Patent Office.

This application is made under the act of March 3, 1883, as amended by the act of April 30, 1928, and the invention herein described and claimed may be used by or for the Government of the United States or any of its officers or employees in the prosecution of work for the Government or by any citizen of the United States without payment to me of any royalty thereon.

The high cost of market milk in large cities at the present time is a partial result of the expense of bottling and delivering the product in the city plant and of the necessity of limiting the milk shed of any given city to its immediate vicinity where the time required for transportation is not excessive.

Fresh milk is often not available at any price, as for example on board ships at sea, or in isolated communities where cows are not kept. In such places it is necessary to rely upon artificial means of preservation. Sweetened condensed, evaporated and powdered milks, which are the products generally used under such conditions, all lack the natural fine flavor of fresh milk.

The value of a method of treating milk which might eliminate the city bottling of the product, reduce much of the bulk of milk by removal of its water and make it possible to store milk or to ship it much longer distances than is done at present, still maintaining its freshness and fine flavor, will thus become obvious.

If plain fresh milk is frozen and later thawed, it will be found that the original structure of the melted milk has been destroyed. The butter fat emulsion is destroyed and the fat rises to the surface unprotected by the milk colloids which originally kept it in the emulsoid state.

The discovery which I have made is that if the concentration of milk protein is increased to a sufficient extent, this protein material will protect the fat emulsion during freezing. When the frozen milk is subsequently thawed the fat emulsion remains intact and a smooth fine consistency of body in the product is maintained. I have found it necessary to concentrate the milk to one-third of its original weight in order to secure a high enough milk-solids-not-fat concentration to protect the fat emulsion during severe freezing conditions (i. e. slow freezing). I have also observed that if a milk is frozen at a concentration greater than 3 to 1, for example 4 to 1, a rapid thickening during storage in the frozen state occurs, resulting in the formation of a more or less water insoluble gel after two or three weeks storage. When a milk concentration of 3 to 1 is used this gel formation does not set in before 7 to 10 weeks, depending upon the storage temperatures used, the colder temperatures inhibiting gel formation.

Milk which is condensed 3 to 1 and held frozen for periods up to eight weeks may be easily reconstituted by the addition of the required amount of hot or cold water. By this process fresh milk can be pasteurized, concentrated to one-third of its original weight, cooled, packaged, and frozen at a point distant from the ultimate consumer and retailed directly without further handling or contamination of the product.

An example of the process covered by my invention is as follows: 100 pounds of fresh milk is pasteurized at 145° F., for 30 minutes and condensed in a vacuum pan by removal of 67 pounds of water. The 33 pounds of concentrated milk is then cooled to 50° F. and immediately run into 14½ oz. tin cans. The cans are sealed and frozen in air at 10° F. The milk is stored at 10° F., or lower until a short time before it is to be used. It is reconstituted by the addition of two times its volume of warm water. The flavor of the milk and the appearance of the cream layer upon standing are entirely similar to that of normal milk.

Having thus fully described my invention, what I claim is:

1. The process of preserving fresh whole milk without producing permanent changes in its physical equilibria, which comprises pasteurizing the milk, condensing it under vacuum thereby removing at least two-thirds of the water present, thence reducing the temperature of the condensed milk to not more than 50° F., and thereafter packaging and freezing the product.

2. The process of preserving fresh whole milk without producing permanent changes in its physical equilibria, which comprises pasteurizing the milk, condensing it under vacuum thereby removing at least two-thirds of the water present, thence reducing the temperature of the condensed milk to not more than 50° F., and thereafter packaging and freezing the product, and storing the frozen product at a temperature of substantially 10° F., and so retaining the said product at such a temperature until ready for consumption.

BYRON H. WEBB.